United States Patent [19]

Zappa et al.

[11] 4,397,424

[45] Aug. 9, 1983

[54] BATTERY RECLAIMING METHOD AND APPARATUS

[75] Inventors: Robert J. Zappa, Newnan; Bobbie Peacock, Peachtree City, both of Ga.

[73] Assignee: M.A. Industries, Inc., Peachtree City, Ga.

[21] Appl. No.: 181,267

[22] Filed: Aug. 25, 1980

[51] Int. Cl.[3] .............................................. B02C 21/00
[52] U.S. Cl. ........................................ 241/20; 241/24; 241/79.1
[58] Field of Search ..................... 241/20, 24, 79, 79.1; 209/156, 157

[56] References Cited

U.S. PATENT DOCUMENTS

| | | |
|---|---|---|
| 1,587,623 | 6/1926 | Zuckerman . |
| 3,393,876 | 7/1968 | Elmoie ................................. 241/20 |
| 3,777,994 | 12/1973 | Fischer ................................ 241/24 |
| 3,892,563 | 7/1975 | LaPoint ................................ 75/97 |
| 4,026,477 | 5/1977 | Tremolada ........................... 241/17 |
| 4,139,454 | 2/1979 | Larson ............................ 209/157 X |

FOREIGN PATENT DOCUMENTS 1105676 11/1965 United Kingdom .
1293974 7/1970 United Kingdom .

OTHER PUBLICATIONS

"The MA-31 Full Line," Prepared by M. A. Engineering, publication date presently unknown.

Primary Examiner—James M. Meister
Attorney, Agent, or Firm—Jones & Askew

[57] ABSTRACT

A system for receiving and crushing whole lead acid storage batteries, and for classifying the components of crushed batteries into lead oxide, lead metal, plastic case components, and rubber case components and other fragments. Whole batteries are crushed into component particles, and lead oxide from the batteries is placed in liquid suspension. The lead oxide is subsequently removed by three separate settling and classifying tanks. Lead metal is removed by a liquid upflow column separation. A flotation tank and surface skimming arrangement separates plastic case fragments from rubber fragments.

5 Claims, 7 Drawing Figures

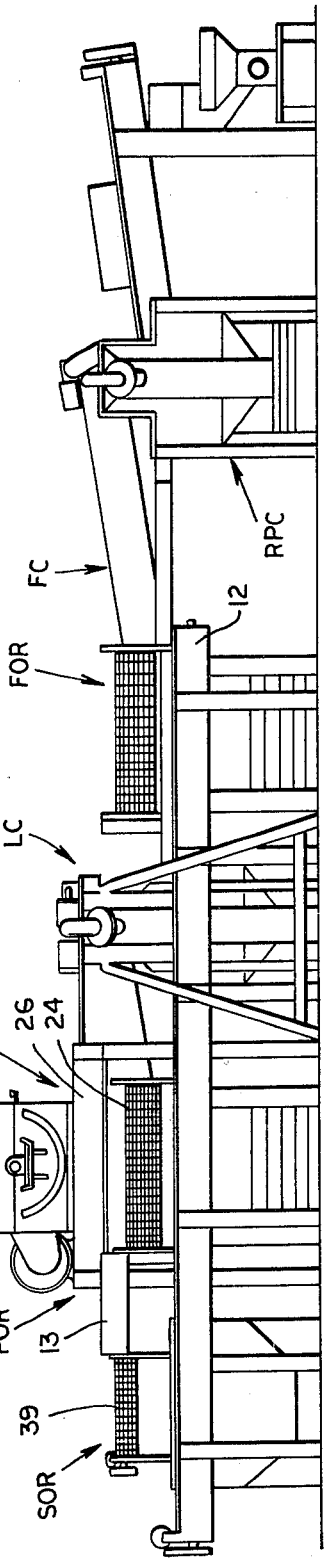
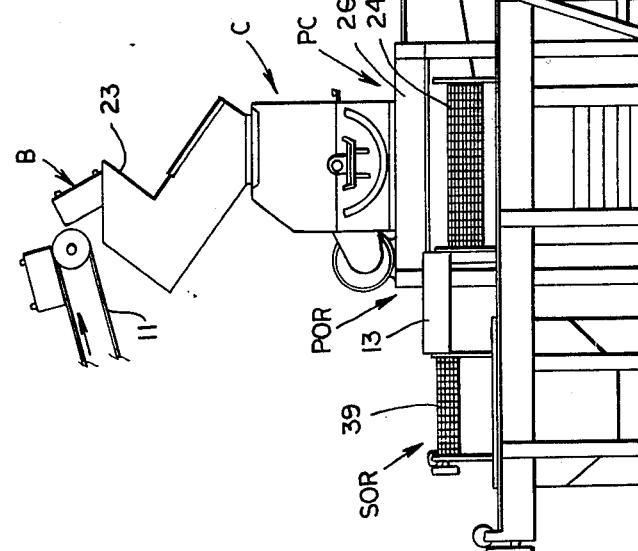

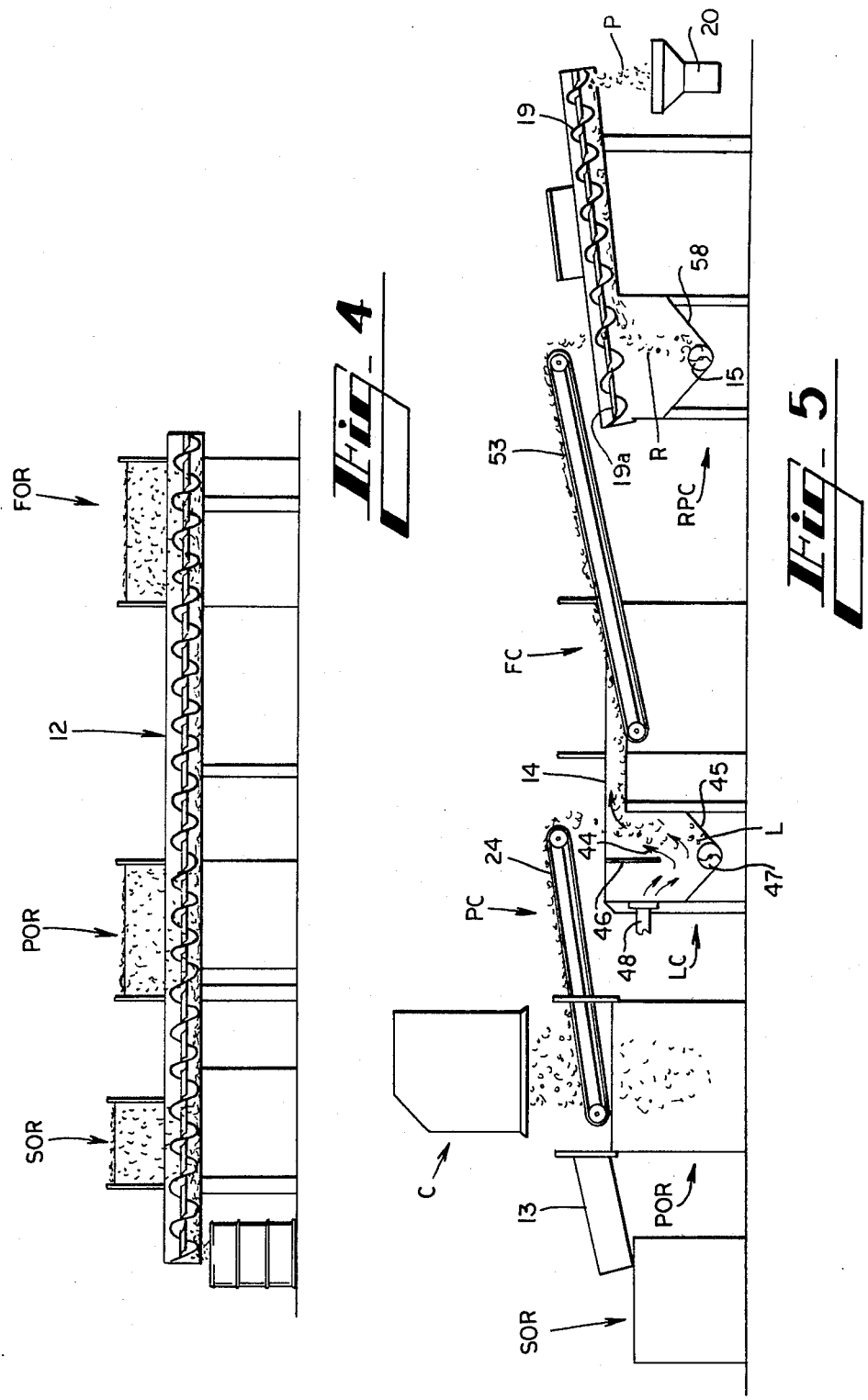

BATTERY RECLAIMING METHOD AND APPARATUS

BACKGROUND OF THE INVENTION

This invention relates in general to battery reclaiming apparatus, and in particular to apparatus for automatically reclaiming and classifying the constituent components of whole lead-acid storage batteries.

There is a need for a relatively economical and effective way to process discarded lead-acid storage batteries so as to reclaim valuable materials remaining in those batteries. A typical storage battery removed from automotive use will contain several pounds of lead in the battery plates, the terminal posts, and interconnecting straps. A significant amount of lead oxide is also present in discarded storage batteries. Both of these materials are commercially valuable when separated from the discarded storage batteries. Discarded storage batteries provide a particularly significant source of lead; it is estimated that approximately 65% of lead production in the United States comes from secondary sources such as reclamation of storage batteries and other manufactured products containing lead.

In addition to reclaiming lead and lead oxide from storage batteries, other components of the discarded batteries may be commercially useful. Most contemporary automotive storage batteries contain cases made of plastic material, and the plastic case material (if reclaimed) can be used as a source of plastic for fabricating other molded products. The hard rubber cases used more frequently in older storage batteries may not be reusable, but must nonetheless be classified and separated from the other components of reclaimed storage batteries.

Although prior art techniques for reclaiming and classifying the components of lead-acid storage batteries have been proposed, various disadvantages are associated with these techniques. For example, some techniques utilize a chemical such as sodium carbonate in the process of reclaiming storage batteries. Another reclaiming process is incapable of processing whole storage batteries; the batteries initially must be prepared for reclamation by sawing off their tops and removing the plate groups, leaving only the tops and battery cases (including lead oxide within) to be processed. This process fails to reclaim the lead and lead oxide within the plate groups, which must be separately processed for lead reclamation. Because whole storage batteries may contain as much as eleven times more lead oxide than the battery cases and tops with plate groups removed, the inability to effectively process whole batteries is a substantial detriment.

Some techniques known in the art for separating relatively light and relatively heavy materials cannot practicably be used in reclaiming storage batteries, due to safety considerations. For example, air flow separation for use in storage battery reclamation could present a serious air pollution problem, due to the presence of lead oxide which could be entrained in the airstream.

SUMMARY OF INVENTION

Stated in general terms, the present system crushes whole lead-acid storage batteries for reclaiming and classifying the lead metal, lead oxide, and plastic, by separating undesirable materials such as rubber, plate separators, and the like from desirable materials. The separated materials are separately deposited in suitable containers for further processing or disposal. The present system uses wet classification, thereby preventing air contamination caused by lead oxide dusting, and thus requiring no air cleaning equipment.

Stated somewhat more specifically, the battery reclaiming apparatus of the present invention includes a device such as a hammermill for crushing batteries into mixed particles of constituent ingredients, namely, battery case material comprising crushed plastic or rubber, lead metal, and particles of lead oxide which becomes suspended in water in the reclamation system and acid released from the crushed batteries. The crushed particles go to a primary oxide classifier, where a substantial part of the lead oxide suspended in water is removed to a primary oxide removal classifier. The mixture of water and acid in the primary oxide remover classifier flow into a secondary oxide remover classifier, for removing oxide particles remaining in suspension in the water. The remaining crushed battery pieces are transferred to a lead metal classifier, where velocity and direction of water flow separates the relatively dense lead metal to separate from the remaining less dense particles. The remaining particles then pass to a final oxide classifier, for removing any residual lead oxide in suspension with the particles entrained in the water flow. The remaining crushed battery pieces go to a flotation classifier where the desirable relatively light plastic case particles are separated from remaining relatively heavy undesirable materials such as rubber case material, fragments of plate separators, and the like.

Accordingly, an object of this invention is to provide improved apparatus for reclaiming lead-acid storage batteries.

Another object of this invention is to provide apparatus for reclaiming the reusable constituent elements of lead-acid storage batteries.

Yet another object of this invention is to provide apparatus for reclaiming and classifying materials from whole lead-acid storage batteries without requiring prior processing or treatment of the batteries.

Other objects and advantages of the present invention will become apparent from the following description of the disclosed preferred embodiment, shown in the accompanying drawings.

BRIEF DESCRIPTION OF DRAWINGS

FIG. 2 shows a front elevation view of the disclosed embodiment, seen from the left side of FIG. 1.

FIG. 3 shows a side elevation view of the primary oxide classifier in the disclosed embodiment.

FIG. 4 is a semischematic view showing the arrangement of the lead oxide separators and oxide collection conveyor.

FIG. 5 is a partially broken away front elevation view of the disclosed embodiment.

DESCRIPTION OF PREFERRED EMBODIMENT

Figure 1:
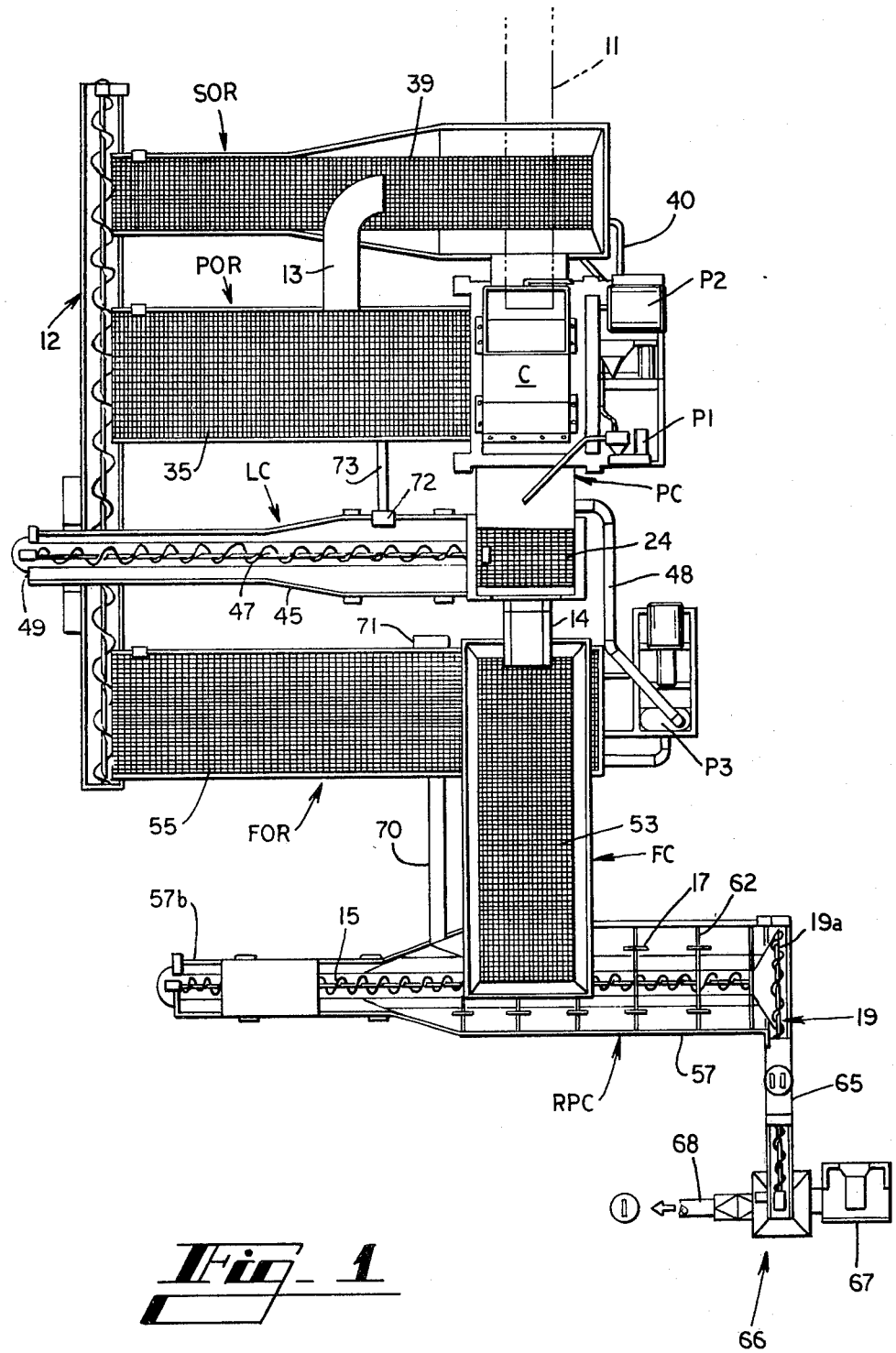
FIG. 1 shows an overall plan view of a whole battery classifying system according to a preferred embodiment of the present invention.

Turning first to FIGS. 1 and 2, there is shown an overall system for the classification and separation of materials in complete lead acid storage batteries according to the present invention. The system includes a crusher unit C which receives and crushes whole storage batteries B delivered to the crusher along a conventional belt conveyor 11. The crusher, which may be a hammermill, crushes or pulverizes the batteries into small pieces of constituent materials, including lead oxide, lead metal, plastic, or hard rubber depending on the composition of the battery cases, and trash including plate separators and other material having no presently known reclamation value. The output of the crusher C includes materials, assuming a mixture of both plastic- and rubber-cased batteries entering the crusher along the conveyor 11.

Positioned directly beneath the crusher is the primary oxide classifier PC, which functions to classify or separate a substantial portion of the lead oxide from the remaining components in the output of the crusher. The oxide separated by the primary oxide classifier PC falls downwardly into the primary oxide removal classifier POR, which includes a chain conveyor operating to separate the oxide from water and to deposit the separated oxide in the oxide collection conveyor 12. The overflow of water and entrained oxide particles from the primary oxide removal classifier POR flows through chute 13 to enter the secondary oxide removal classifier SOR, where further separation of oxide takes place for transfer to the oxide collection conveyor 12.

The material from the primary classifier PC, consisting mostly of lead metal, plastic, rubber, trash, and some residual oxide not removed in the primary classifier, enters the lead classifier LC, where the lead is separated from the remaining plastic, rubber, and oxide components. These remaining components flow through the flume 14 to enter the final oxide classifier PC, where the remaining oxide is removed and enters the final oxide classifier FOR to be deposited in the oxide collection conveyor 12.

The remaining plastic, rubber, and trash components pass from the final oxide classifier FC to the rubber/plastic classifier RPC, where the relatively heavy rubber and trash components sink to the bottom of a liquid filled tank and are removed by a screw conveyor 15 exiting the front end of that tank. The plastic particles float on the surface of water in the classifier RPC, and a series of rotating paddles 17 move the floating plastic particles toward the plastic removal screw conveyor 19 at the back end of the rubber/plastic classifier. The plastic particles removed from the rubber/plastic classifier by the screw conveyor 19 are washed and subjected to an air blast, and then dumped in a suitable container 20.

Each of the major elements of the present system identified above will now be discussed in greater detail, commencing with the crusher C. The purpose of the crusher is apparent from the foregoing discussion, and the crusher should operate to reduce whole batteries by crushing or pulverizing the batteries into pieces substantially consisting only of the discrete ingredients such as plastic or lead, so that no relatively large pieces remain which may contain two or more different kinds of components. The physical size of battery pieces reduced by the crusher C should be coarse enough not to fall through the mesh of the conveyor screen in the primary oxide classifier PC except, of course, for the relatively fine particles of lead oxide.

The crusher C, as stated above, may be a hammermill and is preferably constructed of stainless steel in internal areas subjected to the acid content of crushed batteries.

A receiving hood 23 is mounted above the crusher C to receive batteries from the conveyor 11, and the receiver hood has a zig-zag channel to allow relatively unobstructed entry of the batteries while tending to prevent crushed material from being expelled back out of the feed opening to the crusher. A stream of water is pumped into the receiving hood to flow down into the crusher, to prevent lead oxide dusting by entraining particles of lead oxide released from the newly-crushed batteries.

The primary oxide classifier PC is located directly below the crusher C and immediately above the primary oxide removal classifier POR. The primary oxide classifier PC includes a woven wire conveyor belt 24 preferably fabricated of stainless steel, mounted for movement in a stainless steel body 25. The conveyor belt 24 is motor-driven so that the upper surface of the conveyor belt moves components from the crusher C toward the lead classifier LC. The mesh of the conveyor belt 24 is fine enough to support and convey all relatively coarse particles of material from the crusher C except for oxide carried by the water wash exiting the crusher; the water and entrained oxide particles 0 fall through the conveyor belt 24 onto the dispersion baffle 22 and enter the primary oxide classifier POR located below the conveyor belt. A flow of water is supplied to the conveyor belt 12 from the rinse hood 26 mounted above the conveyor belt, to assist in washing the oxide particles through the belt.

The primary oxide removal classifier POR is best seen in FIG. 3, and includes a tank 29 made of a noncorrosive material such as stainless steel or the like, and having a sloping bottom ranging from a relatively deep end 30 beneath the crusher C, to a forward end 31 elevated above the upper edge 33 of the tank. The tank 29 is filled with water up to a predetermined level 32 near the upper edge 33, and the chute 13 located near the upper edge 33 allows a gravity flow of water and any entrained oxide particles into the adjacent secondary oxide removal classifier SOR.

A drag chain conveyor 35 moves upwardly along the bottom 36 of the tank 29, carrying the oxide O that enters the tank through the primary oxide classifier PC and settles to the bottom 36 of the tank. As best seen in FIG. 2, the conveyor 35 carries the settled particles of oxide upwardly along the bottom 36 of the tank, emerging through the surface 32 of the water and thence to the upper end 31 of the tank for transfer to the transversely-extending oxide collection conveyor 12.

The secondary oxide classifier SOR is located alongside and parallel to the primary oxide removal classifier POR as best seen in FIG. 1. Some of the oxide entering the primary oxide removal classifier POR fails to settle to the bottom 36 of that classifier, and remains entrained or suspended in water. This suspended oxide moves with the gravity flow of water through the chute 13 into the secondary classifier SOR, where the drag chain conveyor 39 associated with the secondary classifier separates much of the remaining oxide from the water and deposits the separated oxide into the oxide collection conveyor 12. Oxide settlement in the secondary classifier SOR is not disturbed by the ongoing turbulent entry of additional water and entrained oxide particles entering the primary removal classifier through the conveyor belt 24.

Referring again to FIG. 1, water is withdrawn from the secondary oxide classifier SOR via an exit line 40 leading to the pump P1 supplying water to the rinse hood 26 above the primary classifier PC, and to the pump P2 supplying water to the receiving hood 23 leading to the crusher C. The secondary oxide classifier SOR is also provided with a water overflow drain (not shown) for removing excess water from the present system. This water contains battery acid and may contain some residual lead oxide, and it will be understood that suitable waste water treatment may be desirable or necessary.

Figure 6:
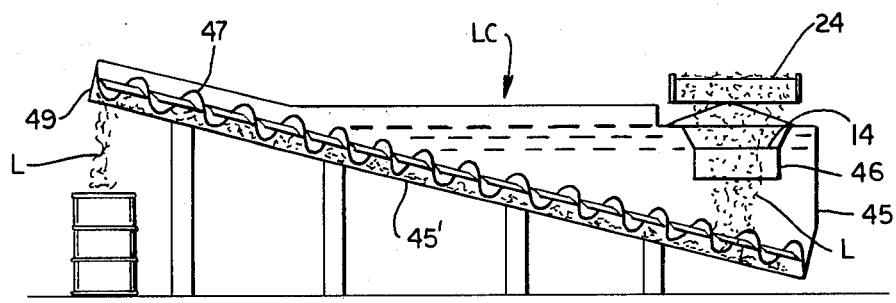
FIG. 6 is a sectioned side view of the lead metal classifier in the disclosed embodiment.

Turning now to FIGS. 5 and 6, crushed battery material remaining on the conveyor belt 24 of the primary oxide classifier PC is dropped into the water upflow column 44 located in the water tank 45 at the back end of the lead classifier LC. The tank 45 is partially divided by a longitudinal partition 46 extending downwardly from the surface of the tank, and terminating well above the screw conveyor 47 at the bottom of the tank. As best seen in FIG. 5, crushed battery materials fall from the conveyor belt 24 into the tank 45 on one side of the partition 46, and at the same time a flow of water enters the tank 45 from the line 48 on the other side of the partition. The water entering through line 48 passes beneath the partition 46 and flows upwardly to form the water upflow column 44, meeting the stream of battery particles entering the tank 45 from the conveyor 24. The relatively dense particles of lead L fall through the water upflow column and settle to the bottom of the tank 45, while the less-dense battery components of plastic, rubber, or remaining oxide particles are carried upwardly by the water upflow column and enter the flume 14 leading to the final oxide classifier FC.

As best seen in FIG. 6, the tank 45 of the lead classifier LC has a bottom 45' extending diagonally upwardly to rise above the surface of the water in that tank. The screw conveyor 47 carries the settled particles of lead along the upwardly-sloping tank bottom 45' to the end 49 of the conveyor, where the separated lead metal L is dumped into a suitable container.

The final oxide classifier FC (FIGS. 1 and 5) includes a stainless steel spiral woven wire conveyor chain 53, motor driven so that the top surface of the conveyor chain moves toward the rubber/plastic classifier RPC. The water and suspended oxide particles from the flume 14 pass through the conveyor chain 53 and fall into the final oxide removal classifier FOR situated below the entry end of the final classifier FC. The final oxide removal classifier FOR may be substantially similar in construction to the primary oxide removal classifier POR discussed above, and the classifier FOR includes a one inch by one inch stainless steel drag chain conveyor belt 55 extending diagonally upwardly along the bottom of the classifier to remove settled particles of oxide for transfer into the oxide collection conveyor 12. It will thus be seen that the present system includes three separate oxide removal classifiers, namely, the primary removal classifier POR, the secondary removal classifier SOR, and the final removal classifier FOR. The use of three stages of oxide removal classification has been found particularly advantageous with the present whole battery classifying system, to maximize the classification and reclaiming of oxide at various stages in the complete reclamation process.

Figure 7:
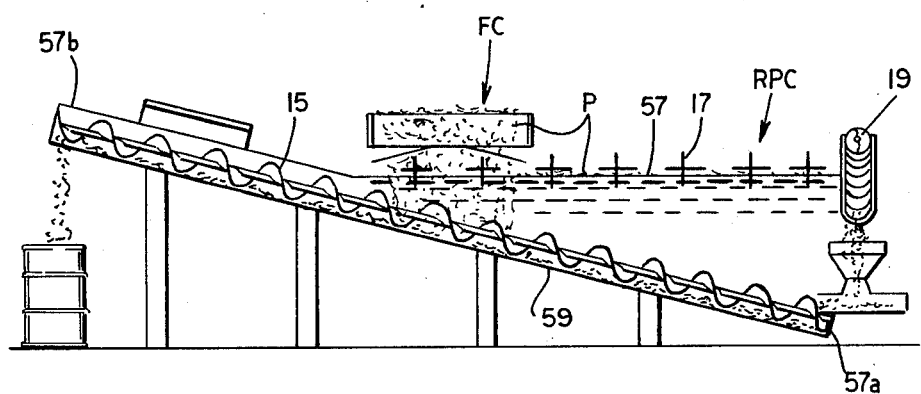
FIG. 7 is a sectioned side view of the rubber-plastic classifier in the disclosed embodiment.

The unclassified crushed battery material remaining on the conveyor chain 53 of the final classifier FC consists of rubber and/or plastic material, along with so-called trash such as plate separators and the like, and this remaining material is dropped into the rubber/plastic classifier RPC. The classifier RPC, as best seen in FIGS. 1 and 7, includes a tank 57 filled with water up to a level 58 slightly below the top of the tank. The bottom 59 of the tank 58 is slanted diagonally upwardly, extending from the deep back end 57a of the tank to the forward end 57b located above the water line 58. The screw conveyor 15 extends along the diagonal bottom of the tank, and is driven in a direction to convey material upwardly toward the upper end 57b of the tank bottom.

The classifier RPC is equipped with a number of paddle wheels 17 mounted on motor-driven rotating shafts 62 (FIG. 1) extending transversely across the width of the tank 57, and is best seen in FIG. 7 the lower ends of the paddle wheels dip into the surface level 58 of water in the tank. The paddle wheels are all rotated in the same direction, tending to move floating material rearwardly in the tank toward the plastic removal screw conveyor 19 at the back of the tank. The relatively dense hard rubber particles P entering the classifier RPC from the chain conveyor 53 will sink to the bottom of the tank 57, along with materials such as plate separator particles and the like, and this relatively dense material is removed from the tank by the bottom screw conveyor 15. The plastic particles P float on the water surface 58, and those plastic particles are moved rearwardly along the surface by the paddle wheels 17 to enter the lower end of the screw conveyor 19.

The screw conveyor 19 extends transversely of the tank 57, and is angled upwardly (FIG. 5) from its lower end 19a engaging the floating material at the water surface in the rear of that tank. The conveyor 19 carries the separated plastic particles through a fresh water wash 65, where the acid water solution from the classification system is rinsed from the plastic particles. Water from the fresh water wash 65 flows by gravity back along the inclined screw conveyor 19 to enter the tank 57 of the classifier RPC.

The washed particles of plastic can be dumped wet into a suitable container 20 disposed at the upper end of the conveyor 19, as seen in FIG. 5. Alternatively, as seen in FIG. 1, the conveyor 19 may lead to an air conveyor 66, including a blower 67 which directs air at high velocity through a venturi which allows material dropped from the conveyor 19 to be entrained into an airstream moving along the conduit 68. The plastic particles thus are conveyed by the moving airstream to a suitable location for bulk packaging or subsequent use.

The operation of the battery classifying system described above is now summarized. Batteries entering the crusher C are crushed into particles of oxide, lead, plastic, rubber, and/or trash that can be easily classified. The relatively fine particles of lead oxide are entrained in the flow of water being pumped into the receiving hood 23, and the entrained lead oxide particles pass through the crusher along with the acid/water solution from the crushed batteries. The liquid and lead oxide are deposited on the conveyor belt 24, and fall through the conveyor belt to enter the primary classifier PC.

The oxide particles settle within the primary oxide removal classifier POR and are carried out of the water by the conveyor 35. Excess water from the classifier POR, along with any unsettled oxide particles in that water, overflow into the secondary oxide removal classifier SOR, where the oxide particles are allowed to settle and are removed in the same manner.

Crushed material remaining on the primary classifier PC is dropped into the water upflow column 44 of the lead classifier LC, where lead metal L is allowed to settle out and is removed by the screw conveyor 47. The remaining material, consisting of remaining oxide particles not previously removed, along with particles of plastic, rubber, and trash, are carried to the final classifier FC by the flume 14. The water from flume 14, and any heretofore unclassified particles of oxide now in suspension with the water, flow through the conveyor chain 53 and enter the final oxide removal classifier FOR where the remaining oxide particles will settle and be removed as in the other two oxide classifiers POR and SOR. The material remaining on the conveyor 53 is dropped into the rubber/plastic classifier RPC, where crushed particles of plastic and rubber battery cases are separated as described above.

The classifier RPC is provided with a water overflow flume 70 having a gravity fall leading to the final oxide removal classifier FOR. Excess water in the classifier RPC, caused by rinse water from the fresh water rinse 65 entering the classifier RPC, is thus supplied to the classifier FOR. When the water in classifier FOR reaches a predetermined level as detected by liquid level sensing probe 71 associated with classifier FOR, valve 72 in pipe 73 opens to allow water to drain from the lead classifier LC to the primary oxide removal classifier POR, where the water mixes with the water in that classifier. When the water in the final oxide removal classifier FOR reaches a predetermined low operating level as sensed by the probe 41, the valve 72 is closed until the water reaches the sensed higher level again. Independently of the water level control provided by the probe 71 and drain valve 72, the pump P3 withdraws water from the final oxide removal classifier FOR and supplies that water via line 48 to provide the water upflow column 44 in the lead classifier LC. At least a substantial part of the water entering the lead classifier LC via line 48 is returned to the final oxide removal classifier FOR through the flume 14, so that the pump 74 effectively acts as a recirculation pump within the present system.

The gravity outflow of water from the primary classifier POR through the flume 13 to the secondary classifier SOR prevents the liquid level in the primary classifier from exceeding a predetermined level. Thus, it is seen that a constant circulation of water is maintained through the system, and an inflow of fresh water is provided so as to prevent an accumulation of acidity from the crushed whole batteries.

It should be understood that the foregoing relates only to a preferred embodiment of the present invention, and that numerous changes and modifications may be made therein without departing from the spirit and scope of the invention as described in the following claims.

We claim:

1. Apparatus for reclaiming whole lead acid storage batteries to classify and recover the component materials of such batteries, comprising in combination:

means for crushing whole storage batteries to reduce the batteries to a particulate mixture comprising relatively coarse particles including fragments of case material and fragments of lead metal, and relatively fine particles including lead oxide;

first classifying means positioned to receive said particulate mixture, and operative to separate the coarse particles from the fine particles;

primary oxide separation means receiving said fine particles of lead oxide separated by said first classifying means;

said primary oxide separation means comprising a tank containing liquid allowing the lead oxide particles to settle within the tank;

secondary oxide separation means comprising a tank containing liquid allowing lead oxide particles to settle within the tank;

liquid conduit means extending between said primary and secondary oxide separation means, and operative to transfer liquid and entrained particles of lead oxide to said secondary separation means from said primary separation means, so as to provide further removal of the oxide from the liquid in said primary separation means;

lead metal separation means positioned to receive said coarse particles from said classifying means, and operative to separate the relatively dense lead metal from the relatively light particles of case materials and other components;

second classifying means receiving said relatively light coarse particles of material from said lead metal separation means, along with a liquid wash which may contain residual particles of lead oxide, and operative to separate the coarse particles from the liquid wash and lead oxide particles;

final oxide separation means comprising a tank to receive the liquid wash and lead oxide particles separated by said second classifying means; and means positioned to receive the coarse particles from said second classifying means and operative to separate the relatively light particles of plastic battery cases from the relatively heavy particles including particles of rubber battery cases.

2. Apparatus as in claim 1, wherein:

said liquid conduit means is operative to withdraw liquid at the surface of said primary separation means exceeding a certain level in said primary separation means, along with particles of lead oxide entrained in said withdrawn liquid, and to conduct said withdrawn liquid and entrained particles of lead oxide to said secondary separation means;

so that said withdrawn liquid is transferred to said secondary separation means for further settlement separation of the lead oxide without being disturbed by additional particles of lead oxide from said first classifying means.

3. Apparatus as in claim 2, further comprising:

means operative to withdraw liquid from said secondary oxide separation means and apply said liquid to said crushing means so that particles of lead oxide released from the crushed batteries are immediately entrained in the liquid.

4. The method of reclaiming whole lead acid storage batteries to classify and recover the component materials of such batteries, including both plastic case and rubber case batteries, comprising the steps of:

crushing whole batteries to reduce the batteries to a particulate mixture comprising relatively coarse particles including fragments of case material and fragments of lead metal, and relatively fine particles including lead oxide;

adding liquid to said particulate mixture to entrain said relatively find particles in liquid;

passing said mixture over a first classifying screen to separate the coarse particles from the fine particles and entraining liquid;

passing said separated coarse particles into a liquid upflow stream having velocity sufficient to entrain only the case fragments, so as to separate the relatively heavy lead metal fragments from the case fragments;

passing said separated case fragments over a second classifying screen to separate the relatively coarse case fragments from remaining particles of lead oxide;

placing said separated case fragments into a flotation tank to permit relatively dense rubber case fragments to settle downwardly in the tank while relatively light plastic case fragments remain at the surface of liquid in the flotation tank;

removing and collecting the plastic case fragments from the surface of the flotation tank;

removing and collecting rubber case fragments from beneath the surface of the flotation tank;

passing said liquid and entrained lead oxide particles from said first classifying screen to a primary liquid tank for the lead oxide particles to settle by gravity within the receiving tank;

withdrawing liquid above a predetermined level in said primary tank, and transferring the withdrawn liquid and remaining oxide particles entrained therein to a secondary liquid receiving tank for gravity settlement separation of said remaining oxide particles; and collecting together the particles of lead oxide separated at said separate steps of oxide removal including the oxide particles separated in said secondary tank.

5. The method of reclaiming whole lead acid storage batteries to classify and recover the component materials of such batteries, including both plastic case and rubber case batteries, comprising the steps of:

crushing whole batteries to reduce the batteries to a particulate mixture comprising relatively coarse particles including fragments of case material and fragments of lead metal, and relatively find particles including lead oxide;

adding liquid to said particulate mixture to entrain said relatively fine particles in liquid;

passing said mixture over a first classifying screen to separate the coarse particles from the fine particles and entraining liquid;

classifying said separated coarse particles to separate the relatively heavy lead metal fragments from the case fragments;

passing said separated case fragments over a second classifying screen to separate the relatively coarse case fragments from remaining particles of lead oxide;

placing said separated case fragments into a flotation tank to permit relatively dense rubber case fragments to settle downwardly in the tank while relatively light plastic case fragments remain at the surface of liquid in the flotation tank;

removing and collecting the plastic case fragments from the surface of the flotation tank;

removing and collecting rubber case fragments from beneath the surface of the flotation tank;

passing said liquid and entrained lead oxide particles from said first classifying screen to a primary liquid tank for the lead oxide particles to settle by gravity within the receiving tank; and withdrawing liquid above a predetermined level in said primary tank, and transferring the withdrawn liquid and remaining oxide particles entrained therein to a secondary liquid receiving tank for gravity settlement separation of said remaining oxide particles.

* * * * *